United States Patent
Pinchovski et al.

(10) Patent No.: US 11,790,019 B2
(45) Date of Patent: Oct. 17, 2023

(54) SEARCHING AND SHARING CONTENT WITH AN OVERLAID INTERFACE

(71) Applicant: ServiceNow, Inc., Santa Clara, CA (US)

(72) Inventors: Barak (Mordechai Zeev) Pinchovski, Re'im (IL); Yafit Segal, Petah Tikva (IL); Shaul Gideon Behr, Beit Shemesh (IL)

(73) Assignee: ServiceNow, Inc., Santa Clara, CA (US)

( * ) Notice: Subject to any disclaimer, the term of this patent is extended or adjusted under 35 U.S.C. 154(b) by 30 days.

(21) Appl. No.: 17/381,603

(22) Filed: Jul. 21, 2021

(65) Prior Publication Data

US 2023/0022675 A1    Jan. 16, 2023

(51) Int. Cl.
*G06F 3/0481* (2022.01)
*G06F 16/953* (2019.01)
*G06T 11/00* (2006.01)

(52) U.S. Cl.
CPC ............ *G06F 16/953* (2019.01); *G06F 3/0481* (2013.01); *G06T 11/00* (2013.01); *G06T 2200/24* (2013.01)

(58) Field of Classification Search
CPC ....... G06F 16/953; G06F 3/0481; G06T 11/00; G06T 2200/24
See application file for complete search history.

(56) References Cited

U.S. PATENT DOCUMENTS

| | | | | |
|---|---|---|---|---|
| 9,342,490 | B1* | 5/2016 | Taylor et al. | G06F 16/95 |
| 2018/0188901 | A1* | 7/2018 | Shtuchkin et al. | G06Q 10/10 |
| 2018/0262864 | A1* | 9/2018 | Reynolds et al. | H04L 67/303 |
| 2019/0340833 | A1* | 11/2019 | Furtwangler et al. | G06F 3/011 |
| 2020/0065398 | A1* | 2/2020 | Shriber et al. | G06N 20/00 |
| 2020/0153711 | A1* | 5/2020 | Chauhan | H04L 41/5096 |

OTHER PUBLICATIONS

Awny Alnusair et al., Reusing Software Libraries Using Semantic Graphs, Jul. 1, 2016, IEEE Computer Society, Pages 531-540 (Year: 2016).*
Emily Hill et al., NL-Based Query Refinement and Contextualized Code Search Results: A User Study, Feb. 1, 2014, IEEE Xplore, Pages 34-43 (Year: 2014).*

* cited by examiner

*Primary Examiner* — Tam T Tran
(74) *Attorney, Agent, or Firm* — Van Pelt, Yi & James LLP

(57) ABSTRACT

An interface of a separate module added to a web browser is overlaid over content of a window of the web browser. A new content item to be added to a repository of content items shared among a select group of users is received via the overlaid interface of the separate module. A search input is received via the overlaid interface of the separate module. One or more content items responsive to the search input within the repository of content items shared among the select group of users are identified. At least one of the identified content items responsive to the search input is provided via the overlaid interface of the separate module for use in the content of the window of the web browser.

20 Claims, 8 Drawing Sheets

Contribute a Textifier!

Title (required)

Description (required)

```
if (!cgr.hasNext()) {
    var cgr = new GlideRecord(table);
    cgr.addQuery('name', 'CONTAINS',
nameSearchFilter);
    cgr.query();
}
cgr.next();

var gr = new GlideRecord('em_event');
gr.initialize();
gr.description = 'Test event ' + i;
gr.cmdb_ci = cgr.getValue('sys_id');
gr.metric_name = 'level1_' + i;
gr.message_key = 'MN_' + new
GlideDateTime().getValue() + '_' + Math.random();
gr.source = 'MN_' + i;
gr.severity = (1 + Math.floor(Math.random() *
4)).toString();
gr.insert();
}
```

Source:   Code ⌄   Type:   JavaScript ⌄

Comma separated tags... (required)

Save Textifier!

Type resource identifier...   History   − + ×

FIG. 2C

SEARCHING AND SHARING CONTENT WITH AN OVERLAID INTERFACE

BACKGROUND OF THE INVENTION

Computer information storage and retrieval systems are designed to store information on computer systems and facilitate retrieval of the information. Examples of computer systems include personal computers and computer networks. In many scenarios, a search, such as a text search, is performed to retrieve information. Typically, a user interface accepts requests for information stored in various data records and displays relevant results. Computer information storage and retrieval systems are oftentimes cumbersome to use and are not designed with user convenience in mind. Thus, it would be beneficial to develop techniques directed toward providing efficient content searching and sharing functionality to users of computer information retrieval systems.

BRIEF DESCRIPTION OF THE DRAWINGS

Various embodiments of the invention are disclosed in the following detailed description and the accompanying drawings.

FIG. 2C is a diagram illustrating an example of an interface receiving computer code as a content item.

DETAILED DESCRIPTION

Figure 1:
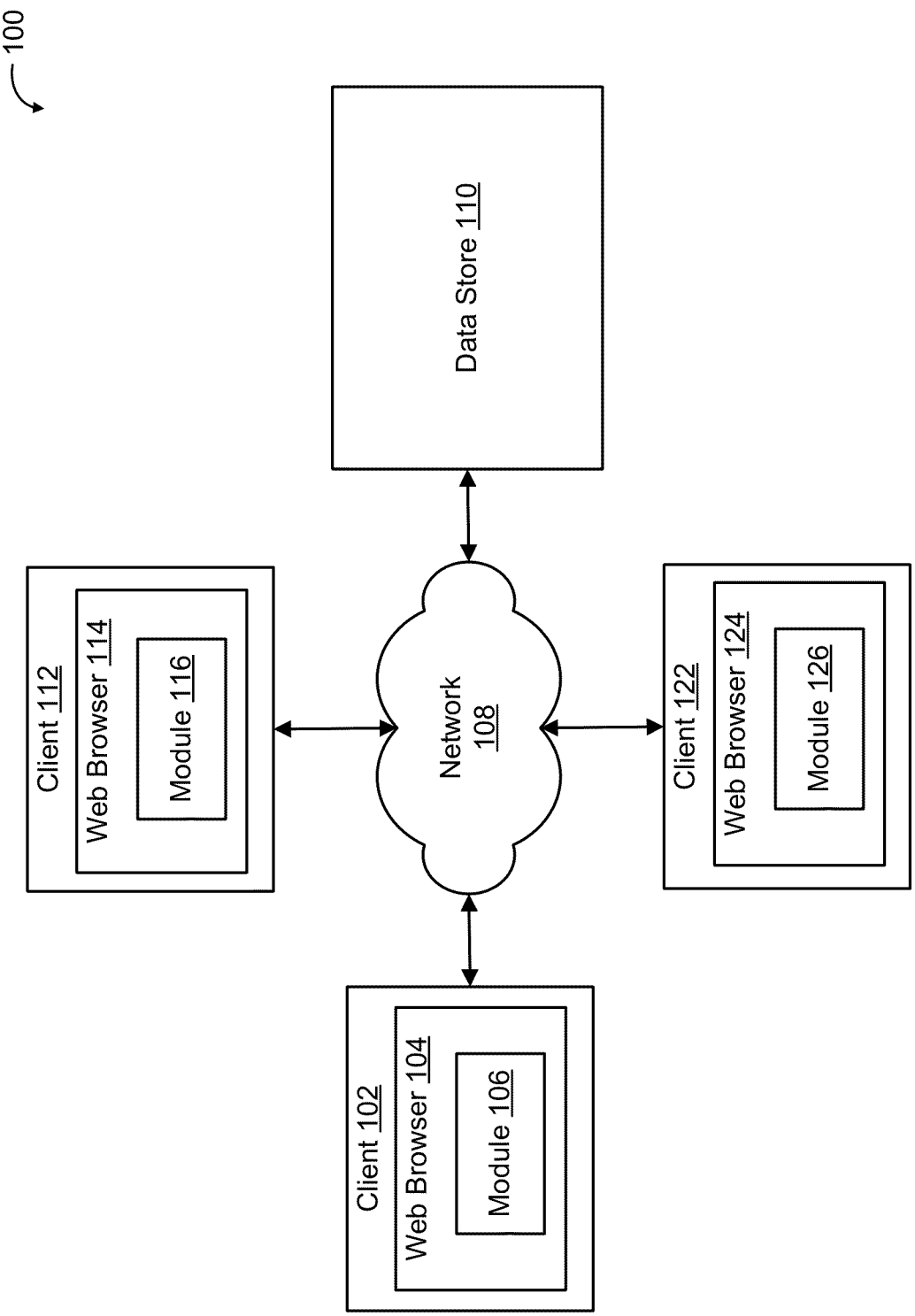
FIG. 1 is a block diagram illustrating an embodiment of a system for searching and sharing content with an overlaid interface.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Searching and sharing content with an overlaid interface is disclosed. An interface of a separate module added to a web browser is overlaid over content of a window of the web browser. A new content item to be added to a repository of content items shared among a select group of users is received via the overlaid interface of the separate module. A search input is received via the overlaid interface of the separate module. One or more content items responsive to the search input within the repository of content items shared among the select group of users are identified. At least one of the identified content items responsive to the search input is provided via the overlaid interface of the separate module for use in the content of the window of the web browser. Technological advantages and improvements to computer information storage and retrieval technology include faster searching of content and more rapid sharing of content among multiple users.

In various embodiments, any type of text data can be shared and searched. Videos, images, and audio may also be shared and searched. In some embodiments, computer files are uploaded. Example file formats include portable document format (PDF), Word, and various other file formats. Example types of text data that can be shared and searched include: computer code, links to Internet content, phone numbers, email addresses, other contact information, technical documentation, data for analysis, logs associated with computer processes or other events, and so forth. In various embodiments, sharing and searching functionality is provided via a web browser plug-in. In various embodiments, content can be contributed and searched for via an interface overlaid on a web browser. Stated alternatively, in various embodiments, sharing and searching functionality is added via a separate software module to an existing computer program (the web browser). It is also possible for the sharing and searching functionality to be added to a different type of computer program, e.g., a computer desktop application. In various embodiments, a plurality of users can search for textual and/or media resources that are stored in a data store via an integrated web browser extension. In some embodiments, the textual and/or media resources are associated with a specific instance of an application and/or platform for which the users have access. The specific instance may reside in the cloud (e.g., available over the Internet).

The techniques disclosed herein solve a problem of how to create a system for fast sharing and searching of content between a select group of users. Utilizing a browser plug-in is advantageous because the web browser that comprises the browser plug-in is a computer program that most, if not all, users of the select group of users is likely already using or can easily install onto a personal computer and start using. Stated alternatively, the browser plug-in is advantageous because of how highly accessible web browsers are. It is advantageous to not require another standalone computer application for users to install. Other systems that require an additional standalone computer application are not as efficient or convenient because users must procure the additional standalone computer application and learn how to use it. Requiring the additional standalone computer application increases complexity and increases time required to share and search for content, particularly when users are likely to already have the web browser open on their computer devices. The techniques disclosed herein are advantageous in part because users are very likely to have a web browser of some kind running (at least in the background). In various embodiments, each user is able to contribute content that other users are able to search for and view. It is also possible for content contributed by a user to be for personal use by only the user. In various embodiments, each user is also able to control access to content that is contributed (e.g., limit access to oneself, to a specified limited group of users, to a larger group of users for which the specified limited group of users is a subset, and so forth).

Contributing and searching for content via an interface overlaid on top of a web browser has numerous advantages. These include: reducing time and increasing productivity for users due to ease of use of the interface, promoting reusability of contributed content due to ease of fetching the content, promoting improvement and addition of content by users, promoting flexibility because a single user or many users can use the interface, and avoiding overloading users with interface components. Productivity of users is increased by reducing time for searching for content. In various embodiments, computer code that is displayed as a result of a search can be executed directly through the interface, thereby saving additional time for users and increasing productivity.

FIG. 1 is a block diagram illustrating an embodiment of a system for searching and sharing content with an overlaid interface. In the example shown, system 100 includes a plurality of clients (clients 102, 112, and 122), network 108, and data store 110. Each client comprises a web browser that includes a separate module built into the web browser. For example, client 102 includes web browser 104, which includes module 106. Client 112 includes web browser 114, which includes module 116. Client 122 includes web browser 124, which includes module 126. In various embodiments, each module is a software module separate from and built into each web browser (e.g., as a plug-in extension). As described in further detail below, each module (e.g., module 106) includes (and is responsible for generating) a user interface that is presented to a user as an overlaid display over content in a window of the corresponding web browser (e.g., web browser 104 corresponding to module 106). As used herein, web browser can refer to a web browser user interface and display and/or web browser software and computer instructions that are responsible for generating the web browser user interface and display. In various embodiments, modules 106, 116, and 126 are similar or the same software. Stated alternatively, in various embodiments, users utilize web browser plug-ins that generate compatible user interfaces through which to share and search for content. The user interfaces utilized by different users may be associated with different versions of the module built into each web browser. The web browsers of the various clients may be the same. It is also possible for the web browsers to be different software applications with each module configured specifically to be compatible with each web browser. In the example shown, the various clients are communicatively connected to one another. They are able to contribute data to a commonly accessible data store for which they all have search access. In various embodiments, each client is a hardware device on which a corresponding web browser is installed. Examples of client hardware devices include desktop computers, laptop computers, tablets, smartphones, and other devices.

In the example illustrated, clients 102, 112, and 122 and data store 110 are communicatively connected via network 108. Examples of network 108 include one or more of the following: a direct or indirect physical communication connection, mobile communication network, Internet, intranet, Local Area Network, Wide Area Network, Storage Area Network, and any other form of connecting two or more systems, components, or storage devices together. In the example illustrated, clients 102, 112, and 122 are able to access data store 110 via network 108. In various embodiments, data store 110 stores data contributed by any user (e.g., a user corresponding to client 102, 112, or 122) and provides stored data in response to a search request by any user (e.g., a user corresponding to client 102, 112, or 122). In various embodiments, data store 110 is a structured set of data held in one or more computers and/or storage devices. Examples of storage devices include hard disk drives and solid-state drives. Data store 110 may include a traditional computer database. Data store 110 may store data in a table format. Data store 110 may be comprised of a computer database that stores an instance of a platform (e.g., a cloud platform) that each user of each corresponding client is able to access. In some embodiments, all data that is shared and searched for resides in data store 110, in which case communication between clients is not strictly necessary. In some embodiments, at least some data that is shared and searched for resides locally on client devices, in which case communication between clients is required to search local storage of clients.

Figure 2A:
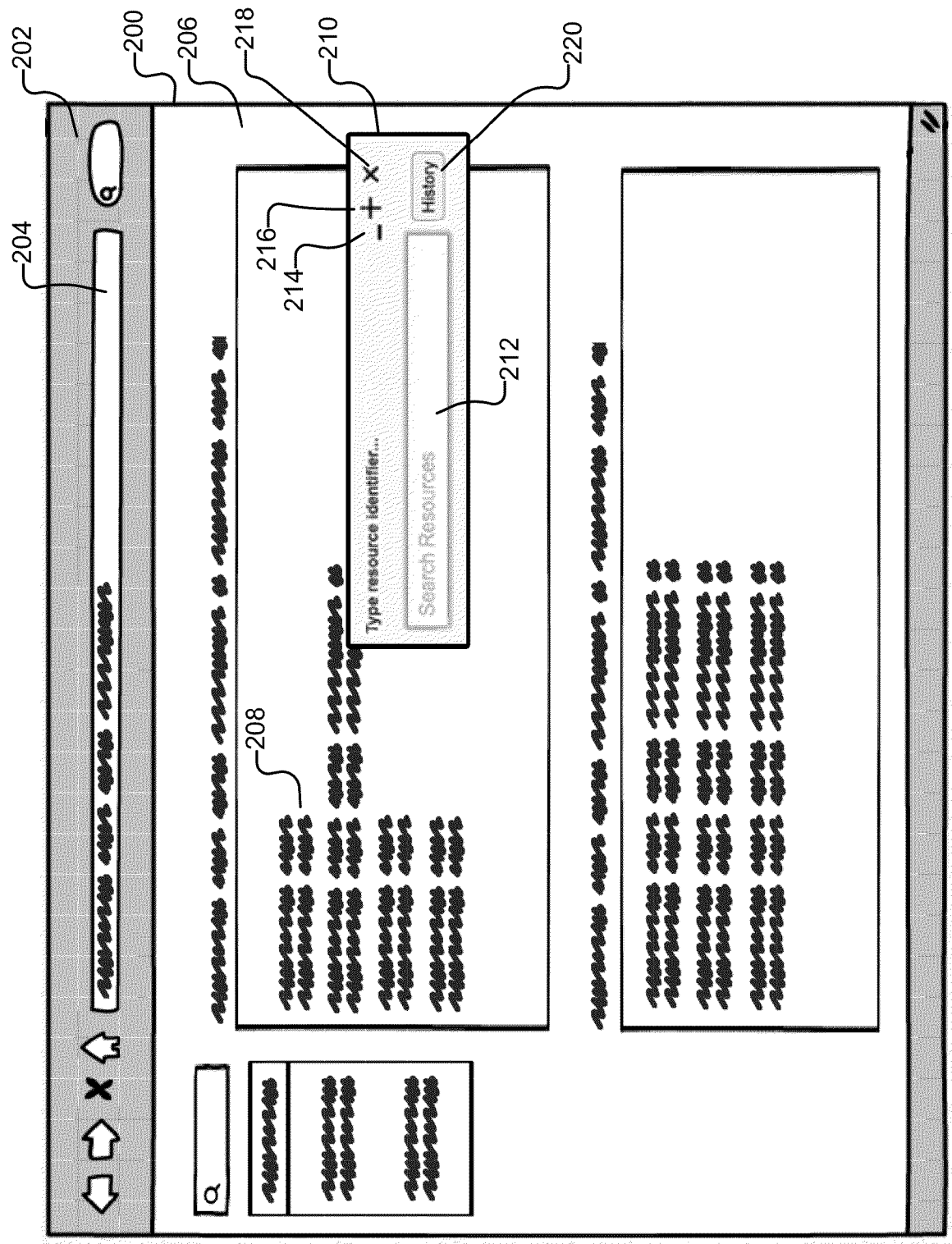
FIG. 2A is a diagram illustrating an example of an interface overlaid over content of a window of a web browser.

In various embodiments, module 106 includes a user interface component that is displayed as overlaid over content of a window of web browser 104. As used herein, a description with respect to module 106 is similarly applicable to modules 116 and 126. In various embodiments, module 106 comprises a separate software module added to web browser 104 that provides computer program instructions for the user interface component of module 106 to be displayed. FIG. 2A is a diagram illustrating an example of a user interface component of module 106 overlaid over content of a window of web browser 104. In the example shown in FIG. 2A, web browser window 200 (corresponding to web browser 104) is displayed in the background relative to interface component 210 (corresponding to module 106). In various embodiments, interface component 210 can be dragged and overlaid anywhere on top of web browser window 200. This allows a user to place interface component 210 in a location that is convenient for the user. The dimensions of interface component 210 are adjustable (able to be resized in a manner similar to resizing of typical windows of software applications, e.g., by dragging window box edges). The scales illustrated in FIGS. 2A — 2F are merely examples and are not restrictive. The size of interface component 210 relative to other components can be different than what is illustrated (e.g., smaller relative to web browser window 200 than is illustrated).

As used herein, a web browser comprises a software application that can be utilized to locate, retrieve and display content on the World Wide Web via the Internet, including Web pages, images, video and other files. In a client/server model, the web browser is the client run on a computer that contacts a Web server and requests information. The Web server sends the information back to the web browser, which displays the results on the computer or other Internet-enabled device that supports a browser. Primary components of the web browser include a user interface to accept commands from a user, a rendering engine to display content requested by the user, e.g., HyperText Markup Language (HTML) content, and a browser engine linking the user interface and the rendering engine. Web browser window 200 includes navigation panel 202, which includes various navigation buttons (e.g., back button, forward button, stop button, and home button), as well as address bar 204. Address bar 204 can accept various types of addresses. Address bar 204 can accept a Word Wide Web address. Address bar 204 can also accept an address for a file or location that is local to a computer on which the web browser is installed or a network address for a file or location corresponding to a network-connected computer (e.g., connected via a local area network). Thus, utility of the web browser is not limited to accessing content on the World Wide Web. In the example shown, web browser window 200 also includes content section 206. Content section 206 includes various information (e.g., textual information, such as textual information 208). In the example shown, textual information of web browser window 200 is represented diagrammatically as undulating lines. Web browser window 200 can also include various other items not shown in FIG. 2A, e.g., a page title, a help button, bookmark buttons, etc. The example shown is illustrative and not restrictive.

In the example illustrated in FIG. 2A, interface component 210 is displayed in the foreground relative to web browser window 200. Stated alternatively, interface component 210 is overlaid on web browser window 200. In the example shown, interface component 210 includes search box 212, minimize interface icon 214, add content icon 216, close interface icon 218, and history button 220. In various embodiments, a user is able to search for content (also referred to as resources) by typing text into search box 212. Stated alternatively, the user is able to type a resource identifier into the search box 212. Searching for content is described in further detail herein (e.g., see FIG. 2D). In various embodiments, minimize interface icon 214 and close interface icon 218 are utilized to minimize and close, respectively, interface component 210. As described in further detail below (e.g., see FIG. 2B), add content icon 216 is utilized to trigger an expansion of interface component 210 to allow the user to contribute content to be stored (e.g., in data store 110 of FIG. 1). In various embodiments, clicking on history button 220 displays a search history. Various features of interface component 210 and conformation changes of interface component 210 in response to user actions are described in further detail herein. In various embodiments, a user of web browser window 200 opens interface component 210 via a specified user input. For example, the user may open interface component 210 by pressing a specified combination of keys on a keyboard (e.g., by pressing CMD+SHIFT+S). It is also possible to open interface component 210 by clicking on a button within web browser window 200 (not shown in the example illustrated) or via another manner that is typically utilized to open software (e.g., via an operating system interface). In various embodiments, interface component 210 is not opened automatically when web browser window 200 is launched. It is also possible to configure interface component 210 to open automatically when web browser window 200 is launched. After interface component 210 is opened, textual (or other types of) resources can be searched for via search box 212.

In various embodiments, interface component 210 is displayed as a result of execution of computer code instructions of a corresponding software module that is separate from and added to a corresponding web browser application of web browser window 200. In some embodiments, the separate software module that is added to the web browser application is a web browser extension that sends queries for textual resources on-demand to a predefined host. The queries may be sent via a representational state transfer (REST) application programming interface (API) (also known as a RESTful API). Stated alternatively, queries can be sent to a host API using REST software architectural constraints. A query request would transfer a representation of state. Various formats may be used to deliver the representation of state, e.g., Javascript Object Notation (JSON), HTML, Python, plain text, etc. In various embodiments, a user (e.g., an administrator user) of interface component 210 has configured a host and service endpoint for interface component 210. In various embodiments, the host is a computer server storing data tables associated with a software application or platform instance for which all the users of interface component 210 have credentials to access. Thus, in various embodiments, a backend of interface component 210 comprises one or more stored data tables, a software service endpoint architecture to access the data tables, and access control logic for users. Users may be provided with usernames and passwords to use interface component 210 and access content associated with interface component 210. Another approach is to utilize a generic identity that is shared among a select group of users (e.g., team members).

Figure 2B:
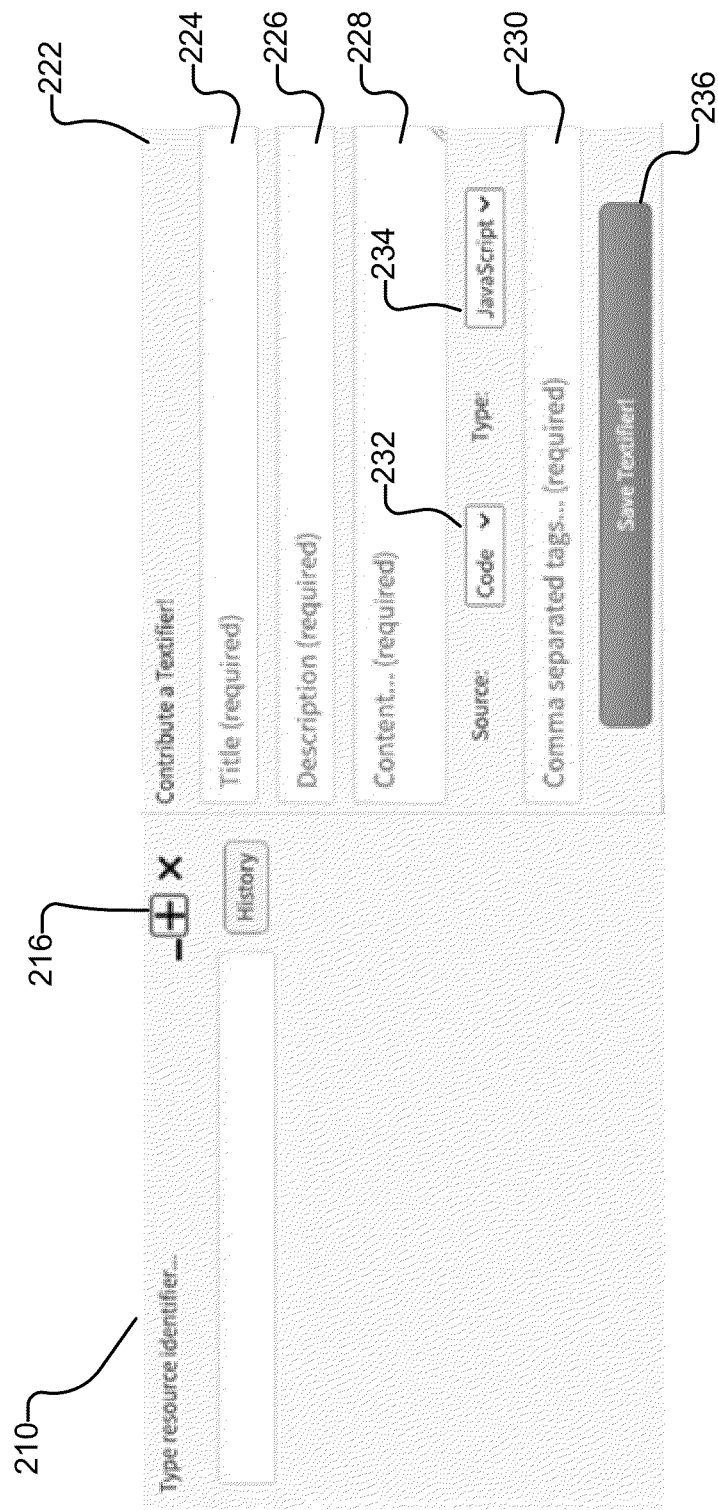
FIG. 2B is a diagram illustrating an example of directing an interface to receive a content item.
Figure 2D:
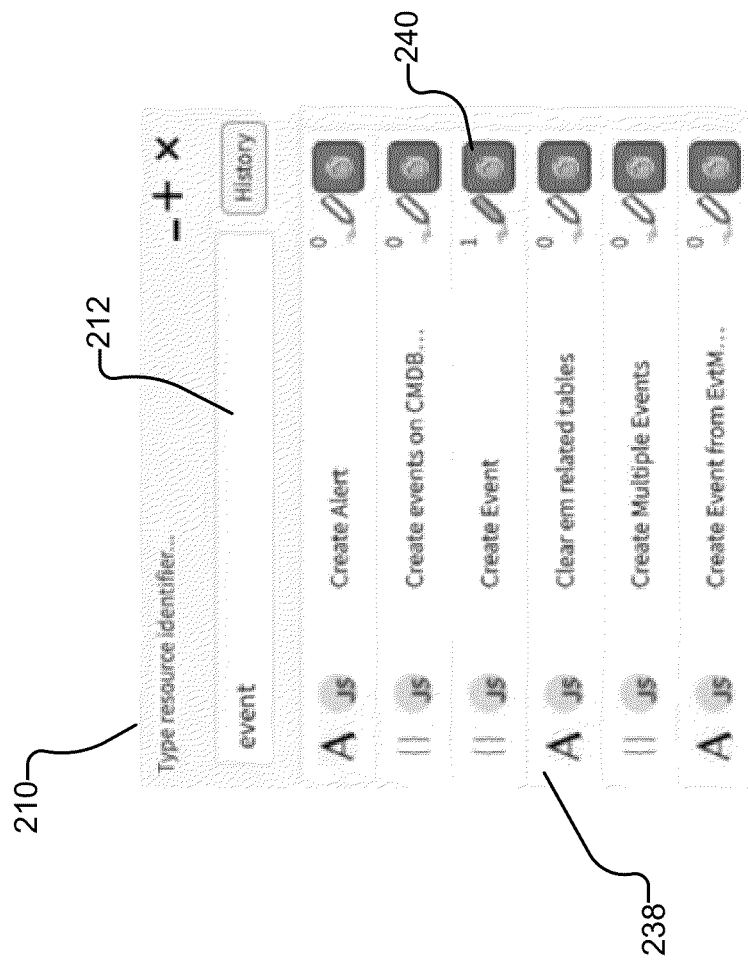
FIG. 2D is a diagram illustrating an example of receiving a search input via an interface and displaying content items responsive to the search input within the interface.
Figure 2E:
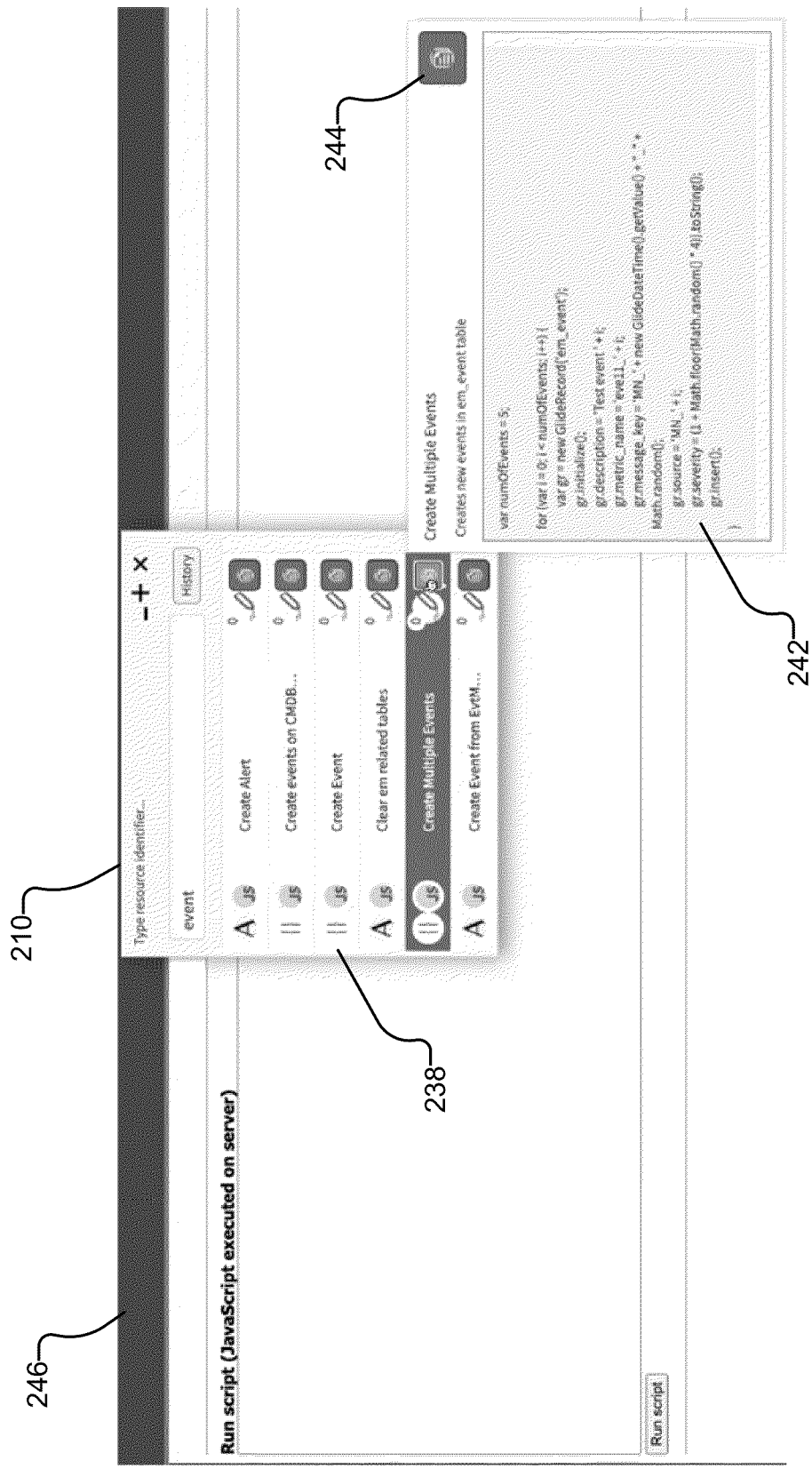
FIG. 2E is a diagram illustrating an example of selecting a content item to transfer from an interface to a window of a web browser.
Figure 2F:
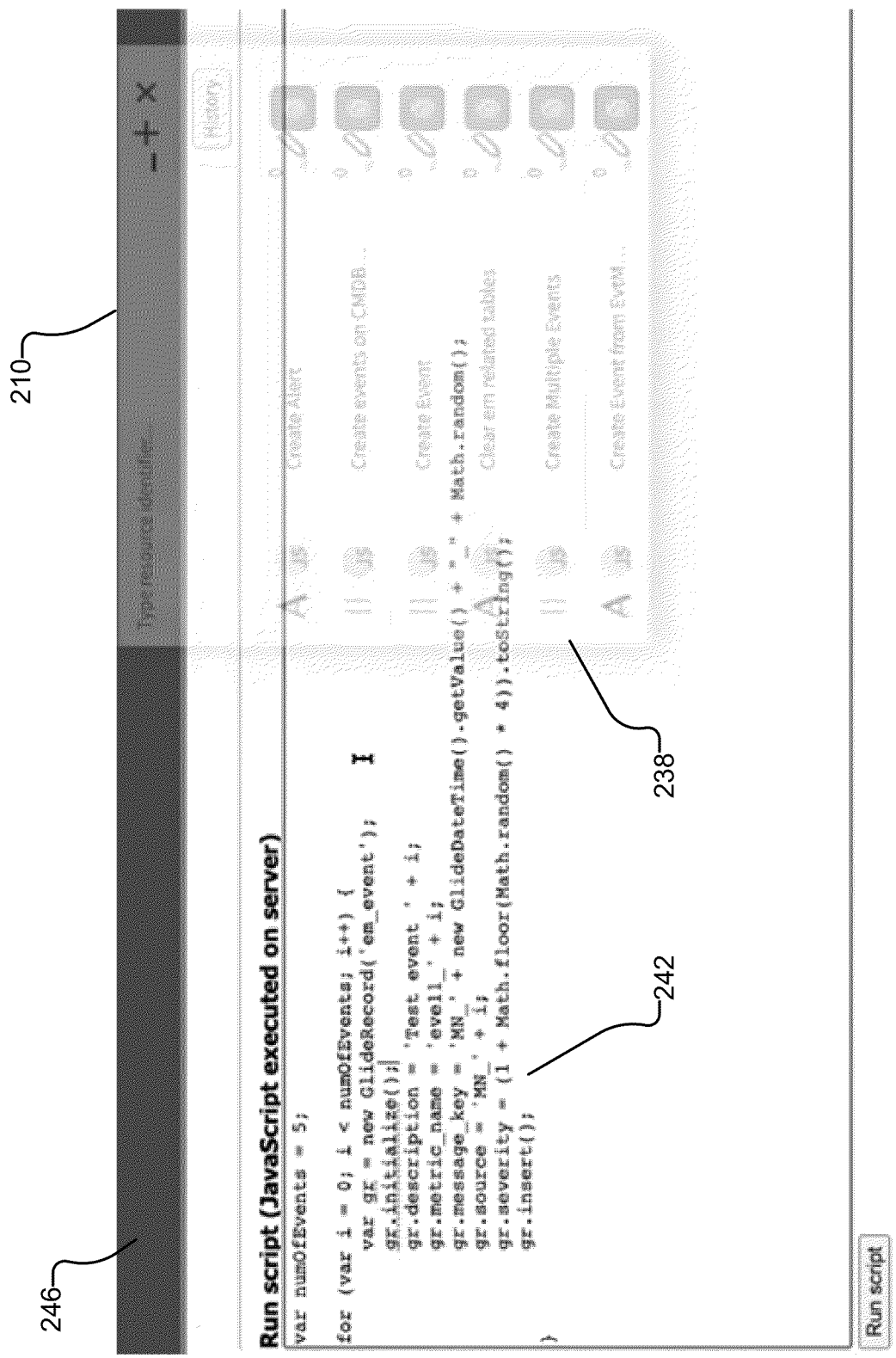
FIG. 2F is a diagram illustrating an example of a result of a transfer of a content item from an interface to a window of a web browser.

In various embodiments, interface component 210 is utilized to receive content items contributed by users. FIG. 2B is a diagram illustrating an example of directing interface component 210 to receive a content item. In FIGS. 2B — 2D, web browser window 200 is omitted for clarity of illustration. In FIGS. 2E — 2F, only a relevant portion of a web browser window is illustrated. It is understood that in FIGS. 2B — 2F, interface component 210 is still overlaid on content of a window of a web browser even if the content of the window of the web browser is omitted in the illustration for clarity purposes. In the example shown in FIG. 2B, in response to clicking on add content icon 216 of interface component 210, contribution interface portion 222 appears. In the example illustrated, contribution interface portion 222 includes a plurality of boxes into which a user is able to enter information associated with a contribution of content. In the example shown, the plurality of boxes includes title box 224, description box 226, content box 228, and tags box 230. The user is prompted to input (e.g., type or copy and paste) content that the user desires to contribute into content box 228. For example, the user may enter computer code into content box 228. The user is able to identify the source of content using drop-down menu 232. Example sources include code, link, phone number, etc. The user is also able to identify the type of content using drop-down menu 234. Example types include JavaScript (applicable to a code source), other code formats, and plain text (applicable to links and phone numbers). Different options may appear in drop-down menu 234 depending on the source selected from drop-down menu 232. The drop-down menus have a finite number of options from which to select. In the example shown, the user is also prompted to input a title for the content into title box 224, a brief description of the content into description box 226 (e.g., a textual descriptive summary of the content), and tags associated with the content into tags box 230. Tags are typically single words that may be particularly useful for filtering content searches (e.g., contributor names, contributor email addresses, team identifiers, unique keywords associated with the content, etc.). In various embodiments, all information inputted into contribution interface portion 222 is indexed and available to be searched by users. In the example shown, the content and metadata associated with the content can be submitted (stored for users to search for and access) by clicking on save button 236. Various sources and types of content may be submitted. FIG. 2C is a diagram illustrating an example of computer code content being contributed. In the example shown in FIG. 2C, computer script code is entered into content box 228 of contribution interface portion 222 associated with interface component 210.

In various embodiments, interface component 210 receives search inputs. In various embodiments, content items (e.g., computer code) contributed by a select group of users are added to a repository of content items (e.g., stored in data store 110 of FIG. 1) that are shared among the select group of users and for which the select group of users can execute searches to identify. FIG. 2D is a diagram illustrating an example of receiving a search input via interface component 210 and displaying content items responsive to the search input. In the example shown in FIG. 2D, the word "event" is entered by a user in search box 212 of interface component 210. In response to "event" being inputted into search box 212 and submitted (e.g., by hitting enter on a keyboard), search results interface portion 238 appears. In the example shown, search results interface portion 238 displays, in a list format, content items that are determined to be responsive to the search input. Responsive items may be determined according to keyword matching between the search input and words in titles, descriptions, content, tags, etc. associated with content items. Similarity scores, machine learning based matching, and various other techniques may also be utilized. In the example illustrated, many of the matching content items also include the search input word "event" in their titles. For example, the third result in the list has a title "Create Event".

In the example shown in FIG. 2D, each result includes a source icon (corresponding to drop-down menu 232 of FIG. 2B) and a type icon (corresponding to drop-down menu 234 of FIG. 2B). These are displayed to the left of each corresponding title. For example, for the "Create Event" result, the source icon is a set of brackets (indicating a code source) and the type icon is a circle that includes the letters "JS" (indicating a Javascript type). In the example shown, immediately to the right of each result is a pencil icon that can be toggled. In various embodiments, the pencil icon corresponds to a relevance voting feature in which clicking on a pencil icon for a specific search result corresponds to the user indicating the specific result is relevant / responsive to the search input. In the example shown, the pencil icon next to the "Create Event" search result is shaded in and a number "1" appears next to the pencil icon to indicate the "Create Event" search result was flagged by the user as relevant / responsive to the search input "event". In some embodiments, search results that are flagged by the user as relevant / responsive are utilized to refine future searches. For example, for searches for "event", results may appear in a list in order of most voted / flagged as relevant / responsive to least voted / flagged as relevant / responsive in descending order. Thus, by flagging search results, users can affect the display of future search results. In various embodiments, users are able to copy content from search results. In the example shown, the user can click on copy button 240 to copy content from the third search result. In various embodiments, the content that is copied corresponds to what is entered in content box 228 of FIG. 2B for the particular content item corresponding to the search result.

In various embodiments, content identified as responsive to a search input is provided from interface component 210 for use in content of a window of a web browser. FIG. 2E is a diagram illustrating an example of selecting a content item to transfer from interface component 210 to a window of a web browser. In the example shown in FIG. 2E, a search result with the title "Create Multiple Events" is selected from search results interface portion 238 of interface component 210. In response to this selection, a new display portion appears to the right of search results interface portion 238 and displays content 242 (corresponding to content from content box 228 of FIG. 2B) for the "Create Multiple Events" search result. In some embodiments, the new display portion appears upon a mouse cursor hovering over the corresponding search result in the list of search results. In this example, content 242 is computer code. In the example shown, the copy button for the "Create Multiple Events" search result is duplicated as copy button 244 located in the new display portion displaying content 242. Clicking on copy button 244 copies content 242 (e.g., to a temporary storage, such as a text clipboard of an operating system) so that content 242 can be transferred to within a browser window, e.g., browser window portion 246. In the example shown, browser window portion 246 includes a box into which computer script code can be inputted for execution. FIG. 2F is a diagram illustrating an example of a result of a transfer of a content item from interface component 210 to a window of a web browser. In the example shown in FIG. 2F, content 242 has been transferred to a script execution area of browser window portion 246. Content 242 in FIGS. 2E and 2F are the same content. In addition, interface component 210 with search results interface portion 238 are displayed as still overlaid on browser window content but now only partially opaque. It is also possible to configure interface component 210 to minimize or close after content is transferred. In some embodiments, when a cursor is not hovered over interface component 210, interface component 210 will appear with partial opacity.

The examples illustrated are not restrictive. Aspects not specifically illustrated or described above may also be present. For example, in some embodiments, content may be stored and searched across multiple hosts. In these embodiments, each user may configure search results to select one or more data sources (e.g., show results from all hosts, one particular host, etc.). In some embodiments, search results can be configured to be contextual. Stated alternatively, search results related to content that is already being displayed in a web browser window or tab can be assigned a higher relevance score and may be displayed higher up in a list of search results. In some embodiments, content that is identified as computer code is executed immediately upon copying (e.g., using copy button 244 in FIG. 2E). In some embodiments, tags are suggested to the user (e.g., user identifying information, such as an email address, a keyword that features prominently in content to be contributed, etc.) for entry into tags box 230 of FIG. 2B. In some embodiments, a translation interface is included so that the user can select content to translate to a different language (e.g., into English from a different language). In the examples illustrated, a data store (e.g., a database) stores content. It is also possible to utilize interface component 210 in a local mode without a database. In some embodiments, recent copy history is also viewable in addition to recent search history by clicking a button (e.g., similar to history button 220 of FIG. 2A). In various embodiments, the number of content items displayed in a history can be configured by users. In some embodiments, users can create temporary notes for themselves that are deleted upon closing or restarting interface component 210. Although not explicitly illustrated in FIGS. 2A - 2F, in various embodiments, each user possesses access control to update and delete contributions made by that user. With respect to deletion, in various embodiments, a user can mark for deletion content that the user contributes. For example, the user may utilize a checkbox to indicate a time (e.g., 5 minutes, 10 minutes, 30 minutes, 1 hour, 3 hours, 6 hours, 12 hours, 24 hours, etc.) after which content contributed by the user is automatically deleted. This allows the user to share content temporarily and not need to remember to delete the content later. This is advantageous for sharing content that is not necessarily useful long term (e.g., draft text and messages). In some embodiments, a pop-up user interface element reminds the user of the automatic deletion and allows the user to delay or cancel the deletion. For content that is computer code, syntax of the code may be highlighted. The syntax highlighting can vary depending on the type of code. In various embodiments, advanced filters are available for search results, e.g., by author, date, source, type, etc. Filtering may be performed by name, description, content, etc. and function via use of logical operators. In various embodiments, users may specifically filter by tags using interface component 210 and/or perform other filtering. In some embodiments, advanced access control settings are also available, e.g., to limit content contribution and/or searching to specific users that have specified authentication credentials (e.g., a specific team of computer programmers). Access control can be defined for multiple teams, and access control scope can be set at varying levels, such as a small group, wider group, entire organization, etc. In some embodiments, interface component 210 can be utilized to select locations from which results are retrieved and/or saved to (e.g., local storage, network locations, all locations, etc.). In various embodiments, these retrieval / save locations may be configured through a separate options menu in which various parameters (e.g., hostname, API endpoint, etc.) can be accessed. In some embodiments, interface component 210 can be utilized to sort search results (e.g., by number of times a content item has been copied, number of votes a content item has received, name, creation time, update time, etc.). In various embodiments, an author or another user with write privileges for a content item may quickly edit a portion of a content item through interface component 210 by double clicking on the portion of the content item (e.g., name field, description field, tags, content, etc.). For example, a user may hover a cursor over a tag, double click on the tag, edit or remove the tag, and double click again to save changes. In various embodiments, interface component 210 includes features that enhance collaboration between users. For example, a username of a user that last edited a content item may be displayed. Content item creation time, last update time, and current status (e.g., "currently being edited") may also be displayed in the user interface. Along with update time and last updated by which user information, in some embodiments, users are also able to utilize version control functionality. For example, users may compare content to older versions of the content and revert to the older versions or merge content from the older versions. In some embodiments, users are able to subscribe to specific content (e.g., specific fields, content from specific storage / network locations, content created by specific users or teams, etc.) so as to receive updates regarding changed content. In some embodiments, a streamlined toolbar with frequently utilized actions (e.g., share content item, edit, save, delete, etc.) is displayed for a faster user experience.

Returning to the example shown in FIG. 1, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients may exist. The number of components and the connections shown in FIG. 1 are merely illustrative. Components not shown in FIG. 1 may also exist.

FIG. 2A is a diagram illustrating an example of an interface overlaid over content of a window of a web browser. FIG. 2A is described above in the discussion associated with FIG. 1.

FIG. 2B is a diagram illustrating an example of directing an interface to receive a content item. FIG. 2B is described above in the discussion associated with FIG. 1.

FIG. 2C is a diagram illustrating an example of an interface receiving computer code as a content item. FIG. 2C is described above in the discussion associated with FIG. 1.

FIG. 2D is a diagram illustrating an example of receiving a search input via an interface and displaying content items responsive to the search input within the interface. FIG. 2D is described above in the discussion associated with FIG. 1.

FIG. 2E is a diagram illustrating an example of selecting a content item to transfer from an interface to a window of a web browser. FIG. 2E is described above in the discussion associated with FIG. 1.

FIG. 2F is a diagram illustrating an example of a result of a transfer of a content item from an interface to a window of a web browser. FIG. 2F is described above in the discussion associated with FIG. 1.

Figure 3:
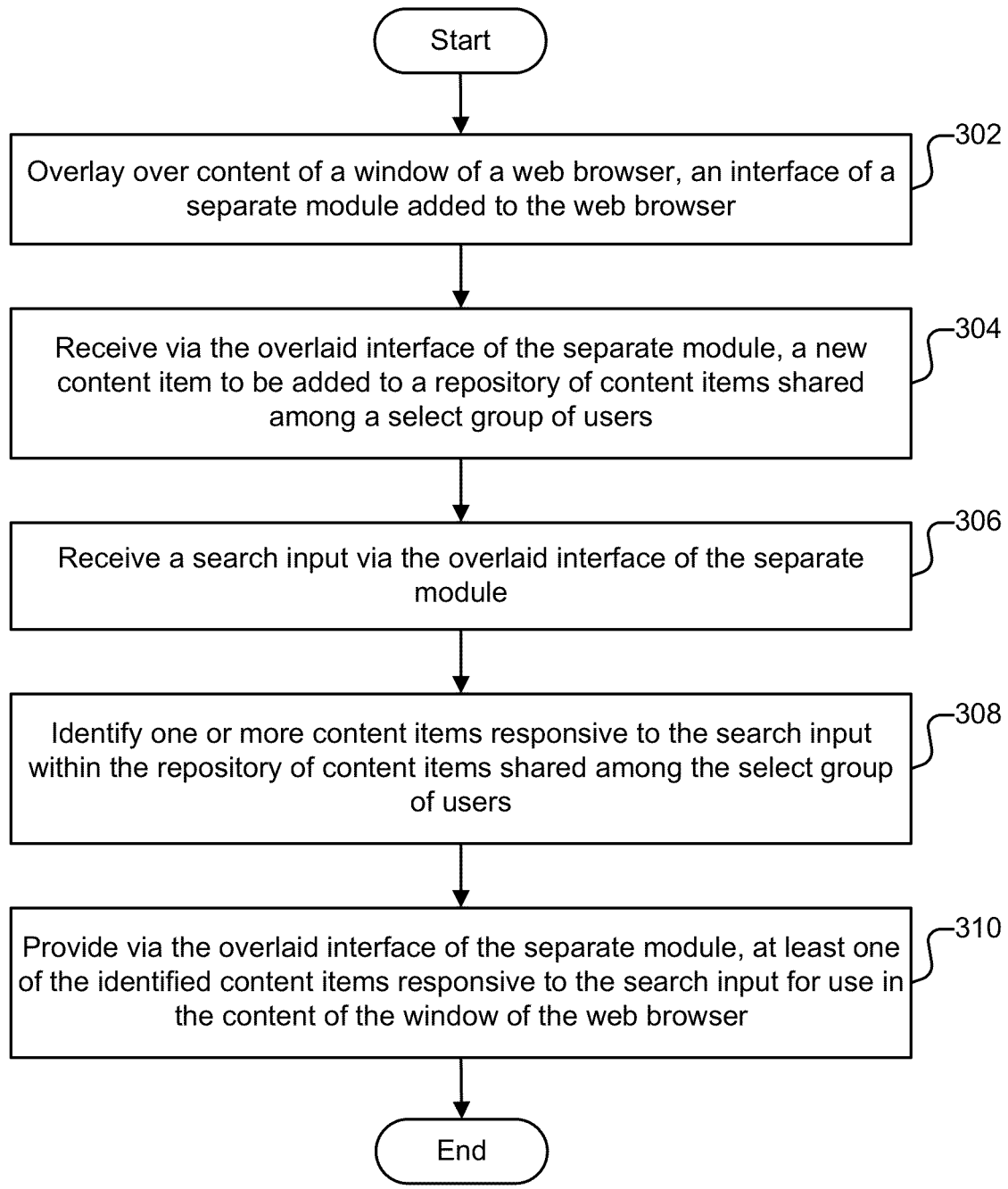
FIG. 3 is a flow diagram illustrating an embodiment of a process for searching and sharing content with an overlaid interface.

FIG. 3 is a flow diagram illustrating an embodiment of a process for searching and sharing content with an overlaid interface. In some embodiments, the process of FIG. 3 is performed by client 102, 112, or 122 of system 100 of FIG. 1.

At 302, an interface of a separate module added to a web browser is overlaid over content of a window of the web browser. In some embodiments, the separate module is module 106, 116, or 126 of FIG. 1. In some embodiments, the web browser is web browser 104, 114, or 124 of FIG. 1. In various embodiments, the separate module is a software component (e.g., a plug-in, extension, etc.) that is integrated into the web browser. In some embodiments, the interface is interface component 210 of FIGS. 2A — 2F. In some embodiments, the window of the web browser is comprised of web browser window 200 of FIG. 2B or browser window portion 246 of FIGS. 2E — 2F.

At 304, a new content item to be added to a repository of content items shared among a select group of users is received via the overlaid interface of the separate module. The new content item may be a segment of computer code (e.g., Javascript code). The new content item may also be a phone number, an email, or any other type of text. It is also possible for the new content item to be non-textual, e.g., audio, image, or video data. An example of a computer code new content item is illustrated in content box 228 of FIG. 2C. In some embodiments, the repository of content items resides in data store 110 of FIG. 1. In various embodiments, the repository of content items corresponds to a host computer system that stores data tables corresponding to content items added by various human contributors. It is also possible for the content items to be at least in part machine-generated. In some embodiments, the select group of users comprises individuals belonging to a common team or organization. In various embodiments, each user of the select group of users is granted authority (e.g., access credentials) to contribute content items to and search for and display content items of the repository of content items. In some embodiments, each user of the select group of users accesses the repository of content items via a network (e.g., network 108 of FIG. 1). In some embodiments, the new content item is received by contribution interface portion 222 of FIGS. 2B — 2C.

At 306, a search input is received via the overlaid interface of the separate module. In some embodiments, the search input is one or more search words. In some embodiments, the search input is received by search box 212 of FIG. 2D.

At 308, one or more content items responsive to the search input within the repository of content items shared among the select group of users are identified. In some embodiments, identifying responsive content items includes performing keyword matching between the search input and words in titles, descriptions, content, tags, etc. associated with content items. In some embodiments, the responsive content items are displayed as a list. An example display of responsive content items is illustrated in search results interface portion 238 of FIGS. 2D — 2F.

At 310, at least one of the identified content items responsive to the search input is provided via the overlaid interface of the separate module for use in the content of the window of the web browser. In some embodiments, providing an identified content item for use includes presenting a display icon which when activated (e.g., by clicking using a mouse cursor) copies the identified content item. Examples of the display icon include copy button 240 of FIG. 2D and copy button 244 of FIG. 2E. Copied content can then be transferred (e.g., pasted via a mouse click) into the window of the web browser for use with content of the window of the web browser. An example location into which a content item is transferred is browser window portion 246 of FIGS. 2E — 2F. In the example shown in FIGS. 2E — 2F, the identified content is computer script code that is transferred into a script execution box that can run the computer script code. Thus, in the example shown in FIGS. 2E — 2F, using the identified content item includes executing computer code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   overlaying over content of a window of a web browser, an interface of a separate module added to the web browser;
   receiving via the overlaid interface of the separate module, a new content item to be added to a repository of content items shared among a select group of users;
   receiving a search input via the overlaid interface of the separate module;
   identifying one or more content items responsive to the search input within the repository of content items shared among the select group of users;
   identifying a different content item responsive to the search input within a local storage of a user computing device, wherein the different content item is stored in the local storage different from the repository of content items; and
   providing via the overlaid interface of the separate module, at least one of the identified content items from the repository of content items or the local storage of the user computing device responsive to the search input for use in the content of the window of the web browser.

2. The method of claim 1, wherein the new content item includes computer code.

3. The method of claim 1, wherein the repository of content items is accessible to the select group of users via a network.

4. The method of claim 1, wherein the repository of content items is located on a host computer system selected by an administrator user.

5. The method of claim 1, further comprising receiving via the overlaid interface of the separate module, a second new content item to be added to the repository of content items, wherein the second new content item is shared among a subset group of users of the select group of users.

6. The method of claim 1, wherein the search input is received via a search box of the overlaid interface of the separate module.

7. The method of claim 1, wherein identifying the one or more content items includes querying a database that is remote from a computer executing the web browser.

8. The method of claim 1, wherein identifying the one or more content items includes performing keyword matching between the search input and text associated with the one or more content items.

9. The method of claim 8, wherein the text associated with the one or more content items includes content item titles and content item descriptions.

10. The method of claim 1, wherein providing via the overlaid interface at least one of the identified content items for use in the content of the window of the web browser includes copying content item text to a temporary storage.

11. The method of claim 1, further comprising moving the overlaid interface of the separate module to overlay over a different portion of content of the window of the web browser.

12. The method of claim 1, further comprising receiving via the overlaid interface of the separate module a classification of the new content item, wherein the classification is selected from a finite list of classifications.

13. The method of claim 1, further comprising receiving via the overlaid interface of the separate module a textual descriptive summary of the new content item.

14. The method of claim 1, further comprising reducing an opacity with which the overlaid interface of the separate module is displayed.

15. The method of claim 1, further comprising displaying within the overlaid interface of the separate module the identified one or more content items responsive to the search input.

16. The method of claim 15, wherein the displayed one or more content items are listed in order of responsiveness to the search input.

17. The method of claim 1, further comprising automatically causing an execution of computer code included in the at least one of the identified content items provided for use in the content of the window of the web browser.

18. The method of claim 1, further comprising displaying a preview of text of the at least one of the identified content items provided for use in the content of the window of the web browser before the at least one of the identified content items is provided for use in the content of the window of the web browser.

19. A system, comprising:

one or more processors configured to:
- overlay over content of a window of a web browser, an interface of a separate module added to the web browser;
- receive via the overlaid interface of the separate module, a new content item to be added to a repository of content items shared among a select group of users;
- receive a search input via the overlaid interface of the separate module;
- identify one or more content items responsive to the search input within the repository of content items shared among the select group of users;
- identify a different content item responsive to the search input within a local storage of a user computing device, wherein the different content item is stored in the local storage different from the repository of content items; and
- provide via the overlaid interface of the separate module, at least one of the identified content items from the repository of content items or the local storage of the user computing device responsive to the search input for use in the content of the window of the web browser; and a memory coupled to at least one of the one or more processors and configured to provide at least one of the one or more processors with instructions.

20. A computer program product embodied in a non-transitory computer readable medium and comprising computer instructions for:
- overlaying over content of a window of a web browser, an interface of a separate module added to the web browser;
- receiving via the overlaid interface of the separate module, a new content item to be added to a repository of content items shared among a select group of users;
- receiving a search input via the overlaid interface of the separate module;
- identifying one or more content items responsive to the search input within the repository of content items shared among the select group of users;
- identifying a different content item responsive to the search input within a local storage of a user computing device, wherein the different content item is stored in the local storage different from the repository of content items; and
- providing via the overlaid interface of the separate module, at least one of the identified content items from the repository of content items or the local storage of the user computing device responsive to the search input for use in the content of the window of the web browser.

* * * * *